(12) United States Patent
Pyron

(10) Patent No.: US 8,899,998 B2
(45) Date of Patent: Dec. 2, 2014

(54) REVOLVING GROUNDING LUG

(71) Applicant: Thomas & Betts International, Inc., Wilmington, DE (US)

(72) Inventor: Roger Pyron, Arlington, TN (US)

(73) Assignee: Thomas & Betts International, LLC, Wilmington, DE (US)

( * ) Notice: Subject to any disclaimer, the term of this patent is extended or adjusted under 35 U.S.C. 154(b) by 73 days.

(21) Appl. No.: 13/716,459

(22) Filed: Dec. 17, 2012

(65) Prior Publication Data

US 2013/0189860 A1    Jul. 25, 2013

Related U.S. Application Data

(60) Provisional application No. 61/589,926, filed on Jan. 24, 2012.

(51) Int. Cl.
| | | |
|---|---|---|
| *H01R 13/648* | (2006.01) | |
| *H02G 3/06* | (2006.01) | |
| *H01R 4/64* | (2006.01) | |
| *H01R 13/52* | (2006.01) | |
| *H01R 4/30* | (2006.01) | |
| *H01R 11/12* | (2006.01) | |
| *H01R 4/66* | (2006.01) | |
| *H01R 4/36* | (2006.01) | |

(52) U.S. Cl.
CPC ............ *H01R 4/30* (2013.01); *H02G 3/0675* (2013.01); *H01R 4/643* (2013.01); *H01R 13/5219* (2013.01); *H01R 4/66* (2013.01); *H01R 4/36* (2013.01); *H01R 11/12* (2013.01)
USPC .......................................... 439/100

(58) Field of Classification Search
CPC ............. H01R 4/64; H01R 4/643; H01R 4/36
USPC .......................................... 439/100
See application file for complete search history.

(56) References Cited

U.S. PATENT DOCUMENTS

| | | | | |
|---|---|---|---|---|
| 1,690,220 A | * | 11/1928 | Fahnestock | 439/100 |
| 1,941,905 A | * | 1/1934 | Mair | 174/78 |
| 2,710,381 A | * | 6/1955 | Monson | 439/95 |
| 2,974,185 A | * | 3/1961 | Curtiss | 174/51 |
| 3,009,128 A | * | 11/1961 | De Carlo | 439/208 |
| 3,027,533 A | * | 3/1962 | Monson | 439/95 |
| 3,365,693 A | * | 1/1968 | Browne | 439/100 |
| 3,492,625 A | * | 1/1970 | Bromberg | 439/100 |
| 3,706,959 A | * | 12/1972 | Norden | 439/208 |
| 3,967,872 A | * | 7/1976 | Mooney et al. | 439/100 |
| 3,988,052 A | * | 10/1976 | Mooney et al. | 439/804 |
| 4,090,029 A | * | 5/1978 | Lundeberg | 174/51 |

(Continued)

*Primary Examiner* — Ross Gushi
(74) *Attorney, Agent, or Firm* — Snyder, Clark, Lesch & Chung, LLP

(57) ABSTRACT

A grounding lug for an electrical conduit fitting includes a support ring sized to slide over a threaded portion of a conduit fitting body and a conductor securing portion having a channel to receive an externally-mounted conducting wire. The grounding lug also includes an extension arm configured to secure the support ring to the conductor securing portion, and a sealing ring, secured along an inside diameter of the support ring. The sealing ring is configured to form a seal between the support ring and the conduit fitting body. The grounding lug is configured to be freely rotated around the threaded portion of the conduit fitting body to position the conductor securing portion in a desired orientation after partial installation of the electrical conduit fitting.

20 Claims, 8 Drawing Sheets

(56) References Cited

U.S. PATENT DOCUMENTS

| | | | |
|---|---|---|---|
| 4,159,859 A * | 7/1979 | Shemtov | 439/100 |
| 4,189,198 A * | 2/1980 | Reichman | 439/100 |
| 4,210,374 A * | 7/1980 | Churla | 439/100 |
| 4,248,490 A * | 2/1981 | Bachle | 439/98 |
| 4,355,852 A * | 10/1982 | Bachle | 439/92 |
| 4,806,108 A * | 2/1989 | Meinhardt | 439/100 |
| 4,875,864 A * | 10/1989 | Campbell | 439/100 |
| 5,480,311 A * | 1/1996 | Luu | 439/100 |
| 5,929,383 A | 7/1999 | Marik et al. | 174/78 |
| 6,840,782 B1 * | 1/2005 | Borden et al. | 439/92 |
| 6,976,857 B1 * | 12/2005 | Shukla et al. | 439/100 |
| 7,002,077 B2 * | 2/2006 | Pyron | 174/652 |
| 7,165,980 B2 * | 1/2007 | Pyron et al. | 439/100 |
| 7,182,611 B2 * | 2/2007 | Borden et al. | 439/92 |
| 7,198,495 B1 * | 4/2007 | Youtsey | 439/97 |
| 7,281,932 B2 * | 10/2007 | Cheng et al. | 439/100 |
| 7,621,763 B2 * | 11/2009 | Clark et al. | 439/100 |
| D618,626 S * | 6/2010 | Kiely | D13/149 |
| 7,758,356 B2 * | 7/2010 | Burris et al. | 439/95 |
| 7,793,988 B1 * | 9/2010 | Shemtov | 285/61 |
| 8,021,169 B1 * | 9/2011 | Smith | 439/100 |
| 8,106,297 B1 * | 1/2012 | Kiely | 174/78 |
| 8,129,633 B1 * | 3/2012 | Shemtov | 174/652 |
| 8,177,563 B1 * | 5/2012 | Vernica | 439/100 |
| 8,192,210 B2 * | 6/2012 | Gardner et al. | 439/100 |
| 8,231,392 B2 * | 7/2012 | Garvin | 439/100 |
| 8,419,449 B1 * | 4/2013 | Smith | 439/92 |
| 8,449,308 B2 * | 5/2013 | Smith | 439/100 |
| 8,512,052 B2 * | 8/2013 | Garvin | 439/100 |
| 2003/0037944 A1 * | 2/2003 | Pyron | 174/48 |
| 2005/0189134 A1 * | 9/2005 | Pyron | 174/65 R |
| 2005/0255728 A1 * | 11/2005 | Pyron et al. | 439/100 |
| 2007/0017688 A1 * | 1/2007 | Pyron et al. | 174/59 |
| 2011/0039431 A1 * | 2/2011 | Garvin | 439/100 |
| 2011/0287643 A1 * | 11/2011 | Lopez | 439/100 |
| 2012/0088380 A1 * | 4/2012 | Smith | 439/100 |
| 2013/0089994 A1 * | 4/2013 | Smith | 439/100 |
| 2013/0189860 A1 * | 7/2013 | Pyron | 439/100 |
| 2014/0097023 A1 * | 4/2014 | Dinh et al. | 174/77 R |

* cited by examiner

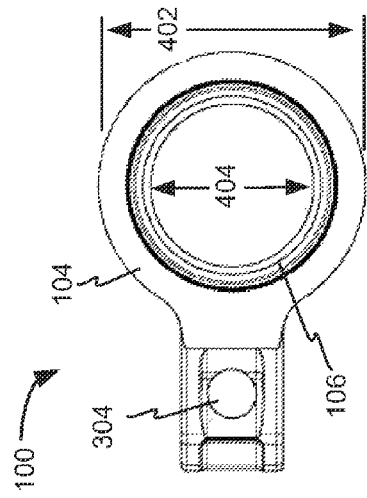
FIG. 4B
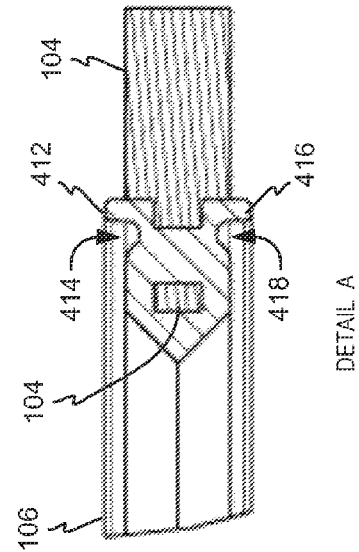
FIG. 4C
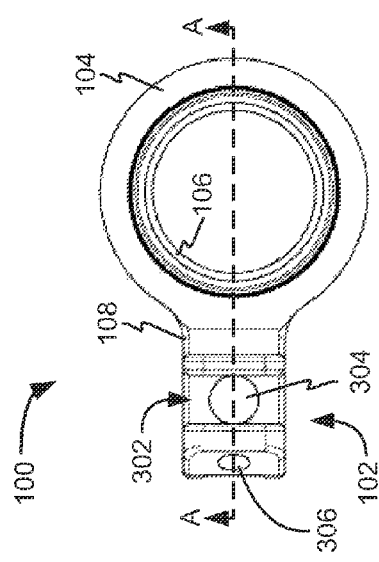
FIG. 4A
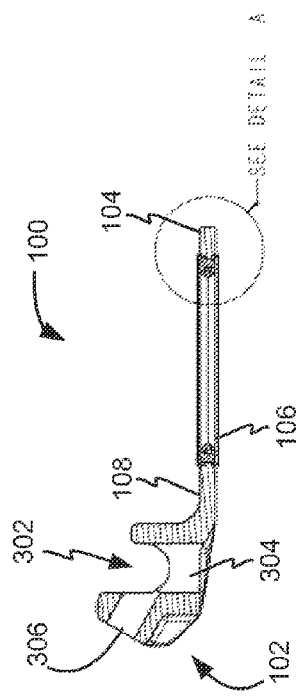

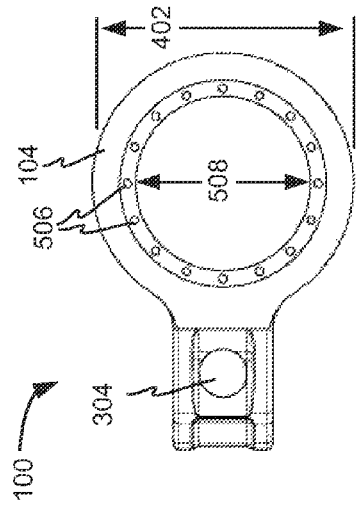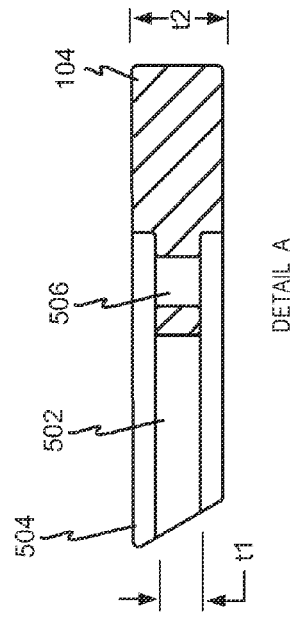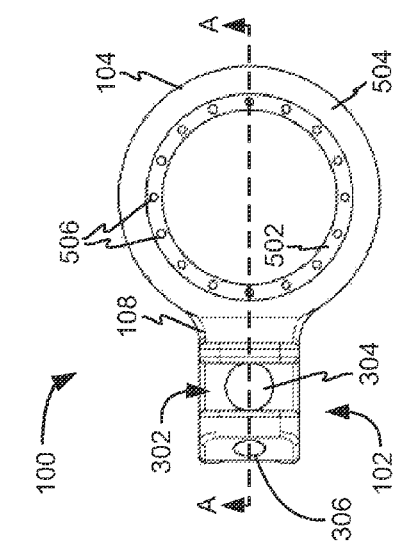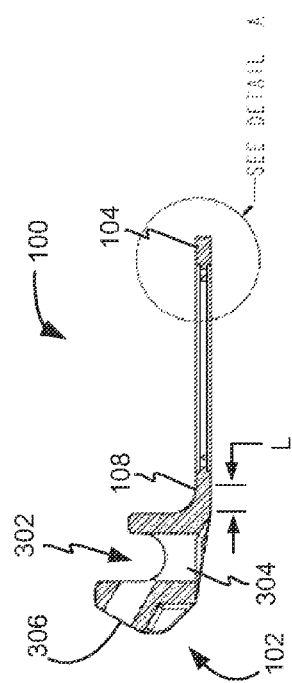

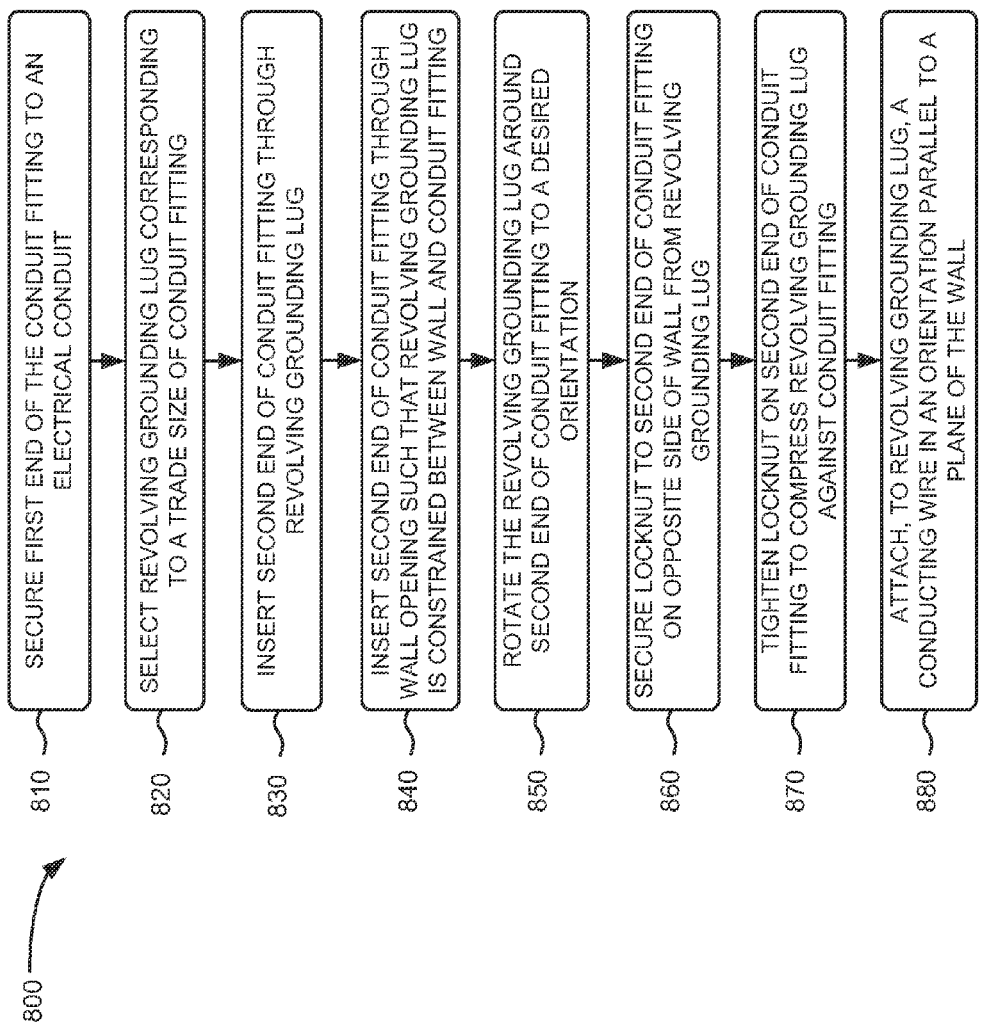

REVOLVING GROUNDING LUG

RELATED APPLICATION

This application claims priority under 35 U.S.C. §119, based on U.S. Provisional Patent Application No. 61/589,926, filed Jan. 24, 2012, the disclosure of which is hereby incorporated by reference herein.

BACKGROUND INFORMATION

In electrical system installations, various electrical codes require the installation of a secondary grounding conductor between fittings on opposing ends of a length of conduit. For example, the NEC (National Electrical Code) requires such a secondary grounding conductor on any run of flexible metallic liquid tight conduit in excess of six feet. Thus, a secondary grounding conductor would be installed (and thus stretch between) the fittings installed on opposing ends of the length of conduit. Additionally, a grounding conductor may be installed between fittings used to terminate and/or couple nonmetallic conduit.

BRIEF DESCRIPTION OF THE DRAWINGS

FIGS. 4A-4C provide a top view, a bottom view, and a side cross-sectional view, respectively, of the revolving grounding lug of FIG. 1 with an installed sealing gasket;

FIGS. 5A-5C provide a top view, a bottom view, and a side cross-sectional view, respectively, of the revolving grounding lug of FIG. 1 without the installed sealing gasket;

FIG. 8 is a flowchart of an exemplary process for installing an externally-grounded electrical conduit fitting, according to an implementation described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein provide a universal revolving grounding lug for an electrical fitting. The revolving grounding lug may be used with conventional fittings to terminate and/or couple conduits, such as flexible metal conduit, non-metallic flexible conduit, non-metallic rigid conduit, etc. In one implementation, the grounding lug may include a support ring sized to slide over a threaded portion of a conduit fitting body and a conductor securing portion that has a channel to receive an externally-mounted conducting wire in either of a substantially parallel orientation or a substantially perpendicular orientation with respect to a plane of the support ring. The grounding lug may also include an extension arm configured to secure the support ring to the conductor securing portion, and a sealing ring secured along an inside diameter of the support ring. The sealing ring may be configured to form a seal between the support ring and the conduit fitting body. The grounding lug may be configured to be freely rotated around the threaded portion of the conduit fitting body to position the conductor securing portion in a desired orientation after partial installation of the electrical conduit fitting.

Figure 1:
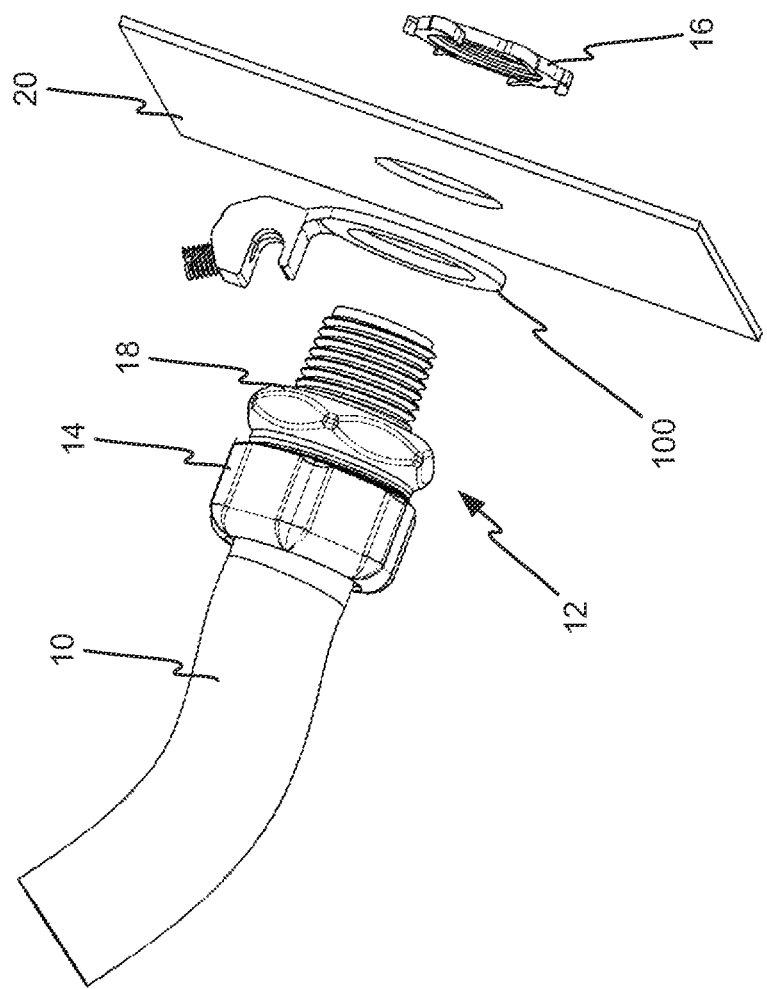
FIG. 1 provides an exploded perspective view of a conduit installation according to an implementation described herein.

FIG. 1 provides an exploded view of a conduit installation according to an implementation described herein. As shown in FIG. 1, a flexible conduit 10 may be terminated by a fitting 12 at a wall 20 of an enclosure (e.g., an electrical box). Fitting 12 may be, for example, a watertight (or liquid-tight) flexible metal conduit fitting. Fitting 12 may include a gland nut 14 and a locknut 16 threadedly connected on either end of a fitting body 18. Fitting body 18 may include a middle portion with threaded sections extending from either side of the middle portion. The middle portion may have a larger outside diameter than the threaded sections and may be configured, for example, to receive a fastening tool (e.g., a wrench). The threaded sections may correspond to standard trade sizes in accordance with, for example, National Pipe Thread Tapered Thread (NPT) standards. Gland nut 14 may include a sealing ring, insulators, and/or other components (not shown) to ensure that conduit 10 is terminated in a watertight fashion. A portion of fitting body 18 may extend through a revolving grounding lug 100 and wall 20 to be secured by locknut 16. As a result, electrical conductors (not shown) extending through conduit 12 can be maintained in a watertight environment.

Generally, flexible conduit 10 and fitting 12 may be provided in standard trade sizes ranging, for example, from one-eighth inch to six inch conduit. Gland nut 14, locknut 16, and fitting body 18 may be formed from zinc-plated steel or another suitable material.

As described further herein, revolving grounding lug 100 may be used with conventional fittings, such as fitting 12, to provide an electrical connection between the fitting and an externally-secured grounding conductor. Still referring to FIG. 1, revolving grounding lug 100 may be configured to slide over a threaded portion of fitting body 18 to be secured between fitting body 18 and wall 20 when locknut 16 is threaded onto fitting body 18. Revolving grounding lug 100 may be rotationally unrestrained (e.g., may be rotated 360 degrees around the threaded portion of fitting body 18) to allow for preferred orientation of revolving grounding lug 100 during installation.

Figure 2B:
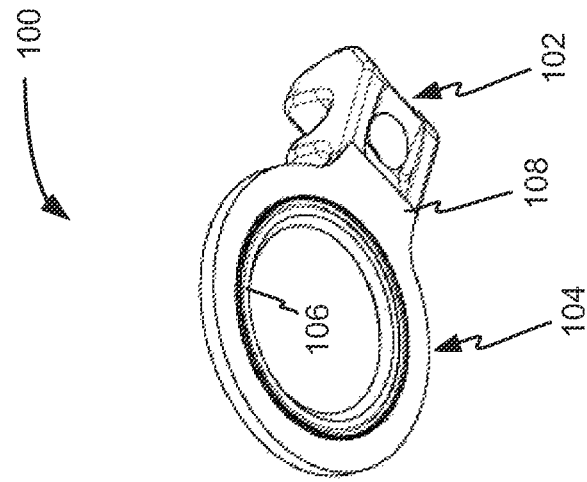
FIGS. 2A and 2B provide a top perspective view and a bottom perspective view, respectively, of the revolving grounding lug of FIG. 1.
Figure 2A:
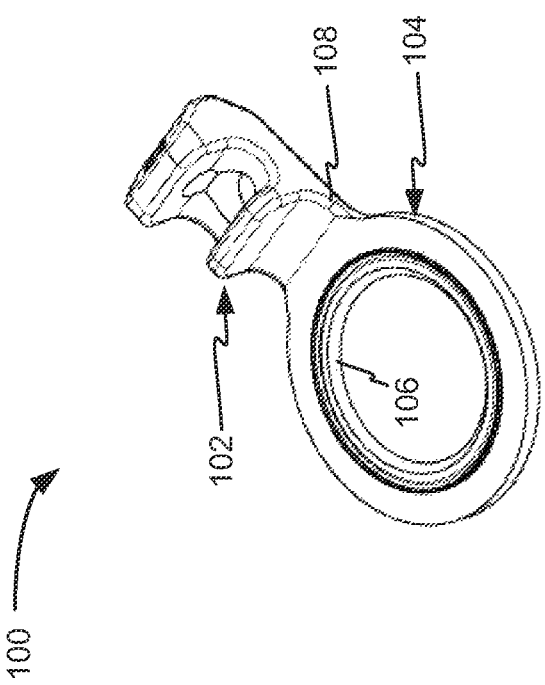

FIGS. 2A and 2B provide a top perspective view and a bottom perspective view, respectively, of revolving grounding lug 100. Referring collectively to FIGS. 2A and 2B, revolving grounding lug 100 may include conductor securing portion 102, a support ring 104, and a sealing ring 106. Conductor securing portion 102 and support ring 104 may be connected via an extension arm 108.

Conductor securing portion 102, support ring 104, and extension arm 108 may be formed from a highly conductive material that provides sufficient tensile strength and corrosion resistance. For example, conductor securing portion 102, support ring 104, and extension arm 108 may include brass, copper, or aluminum. In another implementation, conductor securing portion 102, support ring 104, and extension arm 108 may be formed of a different (e.g., non-electrically-conductive) material and plated with an electrically-conductive material. Sealing ring 106 may be formed from soft material, such a rubber or nylon, that may deform upon installation of revolving grounding lug 100 to form a seal between support ring 104 and fitting body 18. In some implementations, such as a dry installation environment, revolving grounding lug 100 may not include sealing ring 106.

Figure 3:
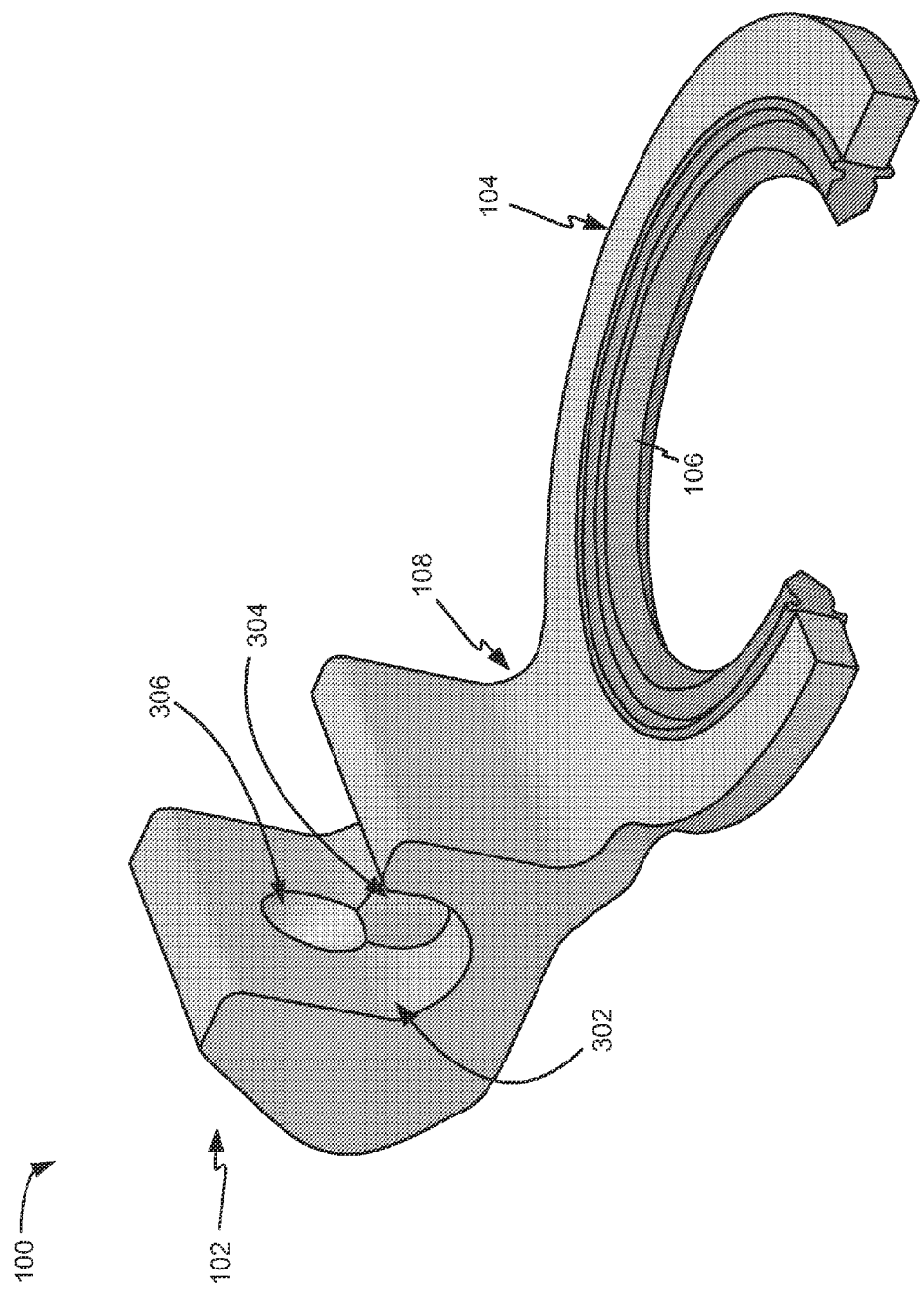
FIG. 3 provides a cutaway view of the revolving grounding lug of FIG. 1.

FIG. 3 provides a cutaway view of the revolving grounding lug of FIG. 1 with installed sealing ring 106. FIG. 4A-4C provide a top view, a bottom view, and a side cross-sectional view, respectively, of revolving grounding lug 100 with installed sealing ring 106. Referring collectively to FIGS. 3 and 4A-4C, conductor securing portion 102 may include a conductor alignment channel 302 that includes access to a pass-through bore 304 and a tapped bore 306.

Figure 6:
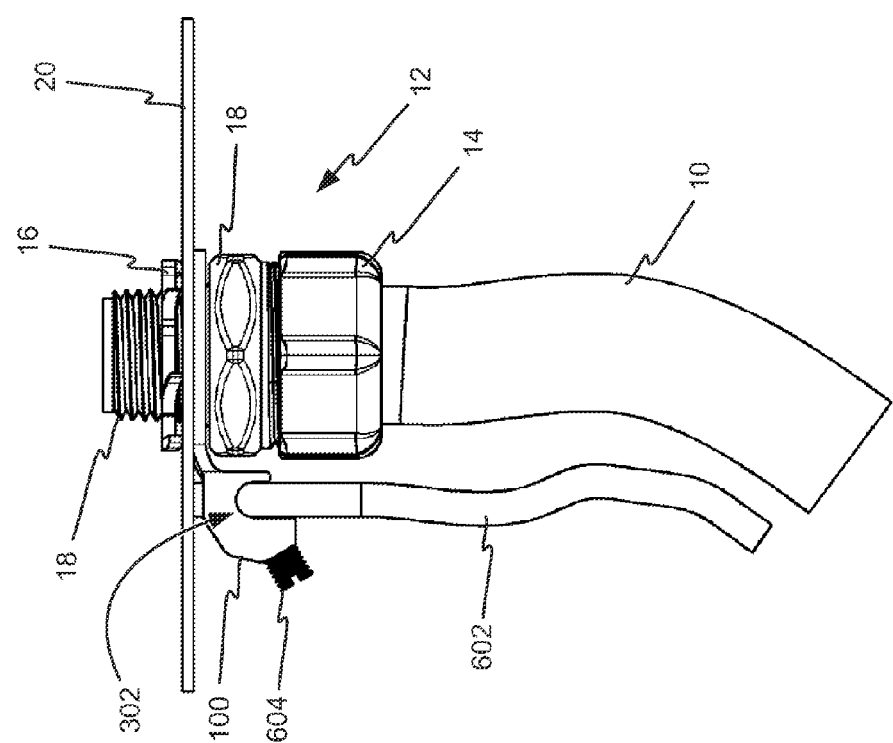
FIG. 6 provides a side view of a conduit installation with perpendicular-style mounting of a grounding conductor according to an implementation described herein.
Figure 7:
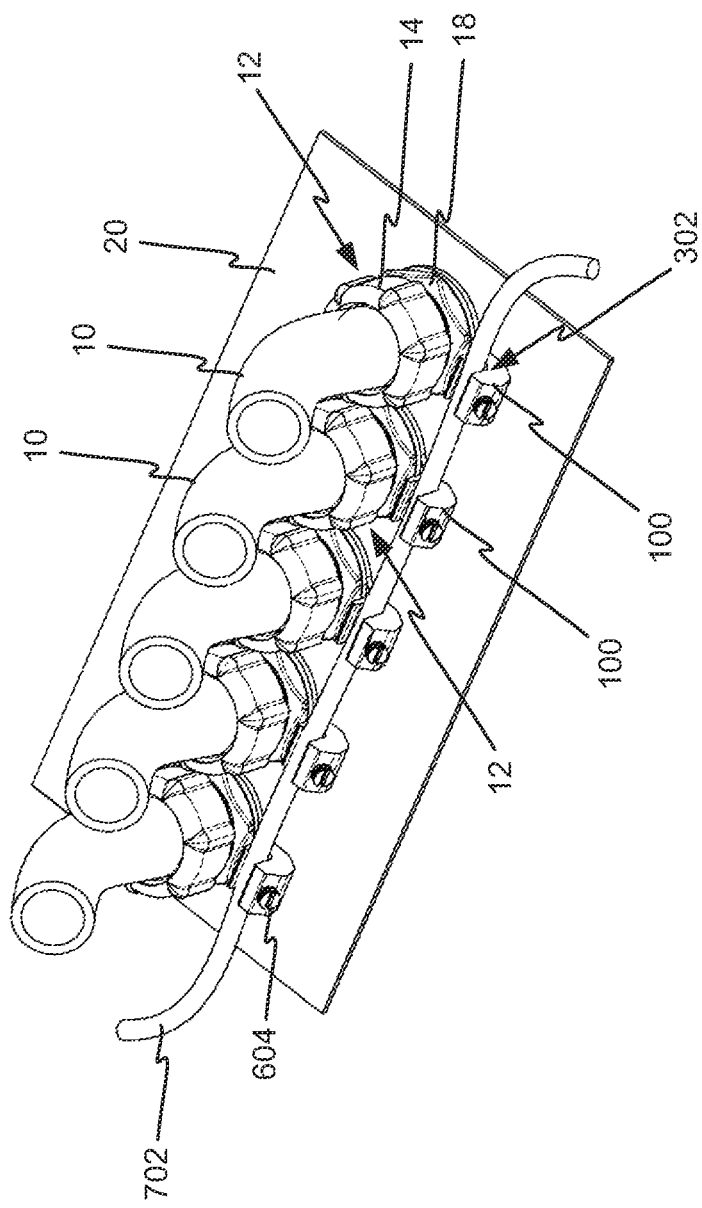
FIG. 7 provides a perspective view of a series alignment conduit installation with parallel-style mounting of a grounding conductor according to another implementation described herein.

Conductor alignment channel 302 may be configured to receive a trade-standard conducting wire (e.g., see grounding conductor 602 of FIGS. 6 and 7). Conductor alignment channel 302 may be configured to receive the conducting wire in an orientation parallel to the plane of support ring 104 (e.g., in the X-axis direction shown in FIG. 3) or perpendicular to the plane of support ring 104 (e.g., in the Z-axis direction shown in FIG. 3). When the conducting wire is inserted into conductor alignment channel 302 in an orientation perpendicular to the plane of support ring 104, the conducting wire may enter pass-through bore 304 to help secure the conducting wire and to prevent rotation of the conducting wire. The diameter of pass-through bore 304 may, in one implementation, match the width (e.g., in the Y-axis direction shown in FIG. 3) of conductor alignment channel 302. When the conducting wire is inserted into conductor alignment channel 302 in either the perpendicular or parallel orientation, a set screw (e.g., see set screw 604 of FIGS. 6 and 7) may be inserted through threaded bore 306 to contact the conducting wire and secure the conducting wire within conductor alignment channel 302. In other implementations, the conducting wire may be secured using another mechanical fastener, permanent crimping, welding/soldering, etc.

Still referring collectively to FIGS. 3 and 4A-4C, support ring 104 may be configured with an outer diameter 402 that is no larger than a corresponding outer diameter of fitting body 18. For example, in one implementation, outer diameter 402 may be less than or equal to the outside diameter of a middle portion of fitting body 18 that separates the two threaded ends.

Support ring 104 may be configured to hold sealing ring 106. Sealing ring 106 may include an upper lip 412 and corresponding interior channel 414 on a top side of sealing ring 106. Sealing ring 106 may also include a lower lip 416 and corresponding interior channel 418 on a bottom side of sealing ring 106. Upon installation of fitting 12 (e.g., as locknut 16 is tightened onto fitting body 18 to secure revolving grounding lug 100 between fitting body 18 and wall 20), upper lip 412 may be compressed and folded into channel 414 to allow fitting body 18 to contact support ring 104. Thus, an electrically conductive contact may be formed between fitting body 18 and revolving grounding lug 100. The compressed/folded upper lip 412 may also provide a watertight seal between fitting body 18 and sealing ring 106. Lower lip 416 and channel 418 may be similarly configured, such that lower lip 416 may fold into channel 418 to form a watertight seal between sealing ring 106 and wall 20.

FIGS. 5A-5C provide a top view, a bottom view, and a side cross-sectional view, respectively, of revolving grounding lug 100 without the sealing ring 106. Generally, sealing ring 106 may be molded directly onto support ring 104. More particularly, as shown in FIGS. 5A-5C, support ring 104 may include an inner portion 502 of reduced thickness (e.g., thickness t1 of FIG. 5C) and an outer portion 504 that is the full thickness (e.g., thickness t2 of FIG. 5C) of support ring 104. Inner portion 502 may include holes 506 which can be filled with material (e.g., liquid rubber, nylon, etc.) for sealing ring 106 during molding of sealing ring 106. Holes 506 may be evenly spaced around a circumference of inner portion 502, and each hole may have a diameter sufficient to allow material to flow into each hole 506.

As shown in FIGS. 4C and 5C, sealing ring 106 may be formed around inner portion 502 and through holes 506 of support ring 104 such that sealing ring 106 is securely and integrally affixed to support ring 104. When material for sealing ring 106 is hardened (e.g., a completion of molding), holes 506 may provide a permanent anchor for sealing ring 106. As shown in FIGS. 4B and 5B, the inside diameter 508 of inside portion 502 may be larger than the inside diameter 404 with sealing ring 106 installed in revolving grounding lug 100.

As described herein, conductor securing portion 102, support ring 104, and extension arm 108 of revolving grounding lug 100 may be part of an integrally formed component. In one implementation, conductor securing portion 102, support ring 104, and extension arm 108 may be cast as a single piece before adding sealing ring 106 as a separate process. Other manufacturing processes may also be used to form revolving grounding lug 100. In another implementation, conductor securing portion 102 may be formed as a separate component which can be thereafter secured (e.g., permanently or removably) to extension arm 108. Alternatively, conductor securing portion 102 may be secured directly to support ring 104 of revolving grounding lug 100.

Extension arm 108 may be configured to balance several variables including material choice, material strength, cross-sectional area, electrical conductivity, and resistance to flexure. More particularly, extension arm 108 has sufficient cross-sectional area as to pass the required quantity of current without failure (e.g., in accordance with applicable Underwriter Laboratories, Inc. (UL) current test standards). It will be appreciated that highly conductive materials, such as copper will more readily pass such electrical current. Simultaneously, extension arm 108 requires sufficient mechanical integrity as to resist flexure and prevent structural failure due to loading (e.g., in accordance with UL mechanical sequence test standards). It will be appreciated that materials such as steel exhibit suitable strength characteristics. In one implementation, extension arm 108 using a brass material with a minimum cross-sectional area of at least 0.02 square inches, and a minimum arm length, L, between conductor securing portion 102 and support ring 104, may satisfy the aforementioned variables. Moreover, extension arm 108 may be strengthened with ribs (not shown) to enhance stiffness.

FIG. 6 provides a side view of a conduit installation with perpendicular-style mounting of a grounding conductor 602 according to an implementation described herein. As shown in FIG. 6, revolving grounding lug 100 may be installed between fitting body 18 and wall 20 with locknut 16 tightened onto fitting body 18 and against wall 20. Revolving grounding lug 100 may be rotated to any desirable orientation about fitting body 18 prior to tightening of locknut 16 and then held in place when locknut 16 is fully tightened. Grounding conductor 602 may be inserted into grounding lug 100 (e.g., into pass-through bore 304 of conductor securing portion 102) such that grounding conductor 602 contacts wall 20. A set screw 604 may be configured to be threadably inserted through revolving grounding lug 100 (e.g., threaded bore 306) into engagement with grounding conductor 602. When set screw 604 is tightened against grounding conductor 602, grounding conductor 602 is both frictionally retained within alignment channel 302 and is maintained in electrical communication with revolving grounding lug 100. In turn, revolving grounding lug 100 is in electrical communication with fitting body 18, locknut 16, and gland nut 14 through physical contact of such components. Additionally, pass-through bore 304 provides an additional contact point to prevent rotation of grounding conductor 602 at the contact point with set screw 604.

FIG. 7 provides a perspective view of a series alignment conduit installation with parallel-style mounting of a grounding conductor 702 according to another implementation described herein. As shown in FIG. 7, multiple (e.g., five) conduit termination fittings 12 may be installed in a physical series with a single grounding conductor 702. Revolving grounding lugs 100 may be installed between each fitting body 18 and wall 20 with locknuts 16 (not visible) tightened onto each fitting body 18. Each revolving grounding lug 100 may be rotated to any desirable orientation about its respective fitting body 18 prior to tightening of locknuts 16 and then held in place when locknuts 16 are fully tightened. As shown in FIG. 7, each revolving grounding lug 100 may be oriented to permit grounding conductor 702 to be inserted through alignment channels 302 of revolving grounding lugs 100. Set screw 604 may be inserted through each revolving grounding lug 100 (e.g., threaded bore 306) into engagement with grounding conductor 602. When each set screw 604 is tightened against grounding conductor 602, grounding conductor 602 is both frictionally retained within alignment channel 302 and is maintained in electrical communication with a respective revolving grounding lug 100. Additionally, the multiple contact points of the respective set screws prevent rotation of grounding conductor 702 around the contact point of any one set screw 604.

FIG. 8 is a flowchart of an exemplary process 800 for installing an externally-grounded electrical conduit fitting, according to an implementation described herein. Process 800 may include securing a first end of the conduit fitting to an electrical conduit (block 810), selecting a revolving grounding lug corresponding to a trade size of the conduit fitting (block 820), and inserting a second end of the conduit fitting through the revolving grounding lug (block 830). For example, as shown in FIGS. 1 and 6, gland nut 14 may be used to secure conduit 10 to an end of fitting body 18. A revolving grounding lug 100 may be selected from a group of standard trade-size lugs based on the size of fitting 12. Revolving grounding lug 100 may then be inserted over the other end of fitting body 18.

Process 800 may further include inserting the second end of the conduit fitting through a wall opening such that the revolving grounding lug is constrained between the wall and the conduit fitting (block 840), and rotating the revolving grounding lug around the second end of the conduit fitting to a desired orientation (block 850). For example, as shown in FIG. 1, the end of fitting body 18 already including revolving grounding lug 100 may be inserted through an opening of wall 20. Revolving grounding lug 100, while sandwiched between wall 20 and a middle portion of fitting body 18, may be rotated around the treaded end of fitting body 18 into a preferred orientation.

Process 800 may also include securing a locknut to the second end of the conduit fitting on an opposite side of the wall than the revolving grounding lug (block 860), and tightening the locknut on the second end of the conduit fitting to compress the revolving grounding lug against the conduit fitting (block 870). For example, as shown in FIGS. 1 and 6, locknut 16 may be inserted on the threaded end of fitting body 18 and tightened to compress fitting body 18 against revolving grounding lug 100 to cause an electrically conductive contact. The rotation of locknut 16 as it is tightened onto fitting body 18 will generally not affect the orientation of revolving grounding lug 100 since wall 20 is interposed between locknut 16 and revolving grounding lug 100.

Process 800 may further include attaching, to the revolving grounding lug, a conducting wire (block 880). For example, as described in connection with FIG. 6, grounding conductor 602 may be inserted into grounding lug 100 (e.g., into pass-through bore 304 of conductor securing portion 102) in a perpendicular orientation such that grounding conductor 602 contacts wall 20. A set screw 604 may be configured to be threadably inserted through revolving grounding lug 100 (e.g., threaded bore 306) into engagement with grounding conductor 602. When set screw 604 is tightened against grounding conductor 602, grounding conductor 602 is both frictionally retained within alignment channel 302 and is maintained in electrical communication with revolving grounding lug 100. In another implementation, grounding conductor 702 may be inserted into grounding lug 100 (e.g., into channel 302 of conductor securing portion 102) in an orientation parallel to the plane of support ring 104.

According to implementations described herein, a grounding lug is provided that can be implemented on any conduit fitting of a given trade size. The grounding lug may be configured to receive an external conducting wire in either of a parallel orientation or a perpendicular orientation (e.g., with respect to a plane of the support ring or a wall). Also, the grounding lug may be rotationally unrestrained so as to be positioned in any orientation prior to a final installation.

According to implementations described herein, a universal revolving grounding lug may allow for reduction of inventories by providing a universal fit for multiple types (e.g., straight, angled, corrosion resistant, etc.) of fittings of particular trade size. The universal revolving grounding lug may also allow for converting standard connectors (e.g., connectors without external grounding connections) into externally grounding connectors without the need for special ordering new connectors.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A grounding lug for an electrical conduit fitting, comprising:
   a support ring including an electrically conductive material, the support ring being sized to slide over a threaded portion of a conduit fitting body;
   a sealing ring secured along an inside diameter of the support ring, wherein the support ring includes a plural- ity of holes along an inner portion of the support ring to receive material of the sealing ring and to anchor the sealing ring;

a conductor securing portion including a channel configured to receive an externally-mounted conducting wire, wherein the conductor securing portion provides an electrical connection to the conducting wire; and an extension arm configured to secure the support ring to the conductor securing portion and to provide an electrical connection between the support ring and the conductor securing portion, wherein the grounding lug is configured to be freely rotated around the threaded portion of the conduit fitting body to position the conductor securing portion in a desired orientation after partial installation of the electrical conduit fitting.

2. The grounding lug of claim 1, wherein the support ring includes an outside diameter that is less than or equal to a largest outside diameter of the conduit fitting body.

3. The grounding lug of claim 1, wherein the support ring, conductor securing portion, and extension arm are cast as a single piece.

4. The grounding lug of claim 1, wherein the conductor securing portion includes a threaded bore configured to receive a set screw to secure the conducting wire against a portion of the channel in either of a substantially parallel orientation or a substantially perpendicular orientation with respect to a plane of the support ring.

5. The grounding lug of claim 4, wherein the conductor securing portion further comprises a bore in the channel to receive the conducting wire and to prevent rotation of the conducting wire within the channel when the conducting wire is inserted in the substantially perpendicular orientation.

6. The grounding lug of claim 1,
wherein the sealing ring is configured to form a seal between the support ring and the conduit fitting body.

7. The grounding lug of claim 6, wherein the sealing ring includes a lip and a corresponding channel on a same surface of the sealing ring, wherein the lip extends around a circumference of the sealing ring beyond a plane of the support ring such that, upon installation of the electrical conduit fitting, the lip is compressed into the corresponding channel to provide a watertight seal and to allow the fitting body to contact the support ring.

8. The grounding lug of claim 1, wherein the extension arm is formed from a metal having a predetermined conductivity and tensile strength relationship, and wherein the extension arm has a cross-sectional area sufficient to conduct a required amount of current without failure and sufficient to provide said grounding lug with mechanical resistance to flexure.

9. A system, comprising:
an electrical conduit fitting including a locknut threadedly connected to a first end portion of a fitting body and a gland nut threadedly connected to a second end portion of the fitting body; and
a grounding lug including:
a support ring including an electrically conductive material, the support ring being sized to slide over the first end portion of the fitting body,
a conductor securing portion including a channel configured to receive an externally-mounted conducting wire in a substantially parallel orientation and a substantially perpendicular orientation with respect to a plane of the support ring, wherein the conductor securing portion provides an electrical connection between the conducting wire and the support ring, and
a sealing ring, on an inside diameter of the support ring, wherein the sealing ring is configured to form a seal between the support ring and the fitting body,
wherein the grounding lug is configured to be freely rotated around the first end portion of the fitting body to position the conductor securing portion in a desired orientation after partial installation of the electrical conduit fitting.

10. The system of claim 9, wherein the grounding lug further includes:
an extension arm configured to secure the support ring to the conductor securing portion and to provide an electrical connection between the support ring and the conductor securing portion.

11. The system of claim 9, wherein the support ring includes an outside diameter that is less than or equal to a largest outside diameter of the fitting body.

12. The system of claim 9, wherein the support ring and the conductor securing portion of the grounding lug are included in an integrated assembly.

13. The system of claim 9, wherein the conductor securing portion of the grounding lug includes a threaded bore configured to receive a set screw to secure the conducting wire against a portion of the channel in either of the substantially parallel orientation or the substantially perpendicular orientation.

14. The system of claim 13, wherein the conductor securing portion further comprises a bore in the channel to receive the conducting wire and to prevent rotation of the conducting wire within the channel when the conducting wire is inserted in the substantially perpendicular orientation.

15. The system of claim 9, wherein the grounding lug provides electrical communication between the conduit fitting body and the conducting wire.

16. The system of claim 9, further comprising:
a plurality of electrical conduit fittings and a plurality of grounding lugs, wherein the conducting wire is connected to both the grounding lug and the plurality of lugs in a physical series.

17. The system of claim 9, wherein the support ring, conductor securing portion, and extension arm of the grounding lug are cast as a single piece.

18. A method for installing an externally-grounded electrical conduit fitting, the method comprising:
securing a first end of the conduit fitting to an electrical conduit;
selecting a revolving grounding lug corresponding to a trade size of the conduit fitting, wherein the revolving grounding lug includes a conductor securing portion, a supporting ring and a sealing ring secured along an inside diameter of the support ring;
inserting a second end of the conduit fitting through the revolving grounding lug;
inserting the second end of the conduit fitting through a wall opening such that the revolving grounding lug is constrained between the wall and the conduit fitting;
rotating the revolving grounding lug around the second end of the conduit fitting to a desired orientation;
securing a locknut to the second end of the conduit fitting on an opposite side of the wall than the revolving grounding lug;
tightening the locknut on the second end of the conduit fitting to compress the revolving grounding lug against the conduit fitting, wherein the sealing ring includes a lip and a corresponding channel on a same surface of the sealing ring, wherein the lip extends around a circumference of the sealing ring beyond a plane of the support ring such that the tightening of the locknut compresses the lip into the corresponding channel to provide a watertight seal and to allow the conduit fitting to contact the support ring; and attaching, to the revolving grounding lug, a conducting wire in an orientation parallel to a plane of the wall.

19. The method of claim 18, wherein the revolving grounding lug includes a channel to receive the conducting wire, and wherein rotating the revolving grounding lug further comprises:

aligning the channel with a channel of another revolving grounding lug to facilitate attaching of the conducting wire to both of the revolving grounding lugs.

20. The method of claim 19, wherein the revolving grounding lug provides an electrical connection between the conduit fitting and the conducting wire.

\* \* \* \* \*